(12) United States Patent
Wood et al.

(10) Patent No.: US 9,194,330 B2
(45) Date of Patent: Nov. 24, 2015

(54) RETROFITABLE AUXILIARY INLET SCOOP

(75) Inventors: Joshua V. Wood, Manchester, CT (US); Michael Joseph Murphy, Windsor, CT (US)

(73) Assignee: United Technologies Corporation, Hartford, CT (US)

(*) Notice: Subject to any disclaimer, the term of this patent is extended or adjusted under 35 U.S.C. 154(b) by 680 days.

(21) Appl. No.: 13/562,366

(22) Filed: Jul. 31, 2012

(65) Prior Publication Data

US 2014/0037437 A1  Feb. 6, 2014

(51) Int. Cl.
F02K 3/075 (2006.01)

(52) U.S. Cl.
CPC ............ *F02K 3/075* (2013.01); *F05D 2230/80* (2013.01); *Y10T 29/49245* (2015.01)

(58) Field of Classification Search
CPC ....................................................... F02K 3/075
See application file for complete search history.

(56) References Cited

U.S. PATENT DOCUMENTS

| 4,938,021 A | 7/1990 | Jones et al. |
| 5,319,927 A | 6/1994 | Maguire |
| 6,106,229 A * | 8/2000 | Nikkanen et al. ............. 415/179 |
| 7,434,303 B2 | 10/2008 | Maguire |
| 7,549,282 B2 | 6/2009 | Widenhoefer et al. |
| 7,952,244 B2 | 5/2011 | Colin |
| 8,092,153 B2 | 1/2012 | Strecker et al. |
| 8,858,163 B2 * | 10/2014 | Hussain ........................ 415/116 |
| 2008/0219833 A1 | 9/2008 | Suciu |
| 2010/0209239 A1 | 8/2010 | Tonks |
| 2010/0223905 A1* | 9/2010 | Todorovic et al. ........... 60/226.1 |
| 2010/0276007 A1 | 11/2010 | Hendricks |
| 2011/0259546 A1 | 10/2011 | DeFrancesco |
| 2012/0014784 A1 | 1/2012 | Hipsky |

OTHER PUBLICATIONS

International Search Report and Written Opinion for International Application No. PCT/US2013/051187 completed on Nov. 8, 2013.
International Preliminary Report on Patentability for International Application No. PCT/US2013/051187 mailed Feb. 12, 2015.

* cited by examiner

*Primary Examiner* — Richard Edgar
(74) *Attorney, Agent, or Firm* — Carlson, Gaskey & Olds, PC

(57) ABSTRACT

A gas turbine engine includes a fan nacelle and a core nacelle spaced radially inwardly of the fan nacelle to define a bypass flowpath. The engine includes a scoop to direct air from the bypass flowpath into an engine core. The scoop is comprised of a first piece extending outwardly of an outer surface the core nacelle to define an air inlet and a second piece extending inwardly of the core nacelle to define an air outlet.

24 Claims, 9 Drawing Sheets

RETROFITABLE AUXILIARY INLET SCOOP

BACKGROUND

A gas turbine engine includes an outer fan duct that surrounds an engine core to define a bypass flowpath. The engine core has a core nacelle that includes an inner structure. A scoop is attached to the inner structure to direct external air from the bypass flow path into the engine core for cooling or performance improvement.

Typically, structures having nacelle attachment interfaces are configured to be attached from within the core to minimize steps and gaps in the nacelle outer surface. However, this traditional configuration does not provide for easy interchangeability to vary scoop dimensions.

SUMMARY

In a featured embodiment, a nacelle assembly has a fan nacelle, a core nacelle spaced radially inwardly of the fan nacelle to define a bypass flowpath, and a scoop to direct air from the bypass flowpath into an engine core. The scoop is comprised of a first piece extending outwardly of an outer surface of the core nacelle to define an air inlet and a second piece extending inwardly relative to the core nacelle to define an air outlet.

In another embodiment according to the previous embodiment, the first piece and second pieces are attached to each other with at least one attachment feature.

In another embodiment according to any of the previous embodiments, the core nacelle includes an inner structure. The second piece is fixed to the inner structure with at least one attachment feature.

In another embodiment according to any of the previous embodiments, the core nacelle includes a hole formed in an outer surface of an inner structure. The first piece includes a tubular portion to be inserted through the hole in a direction from outside the core nacelle. The first piece is attached to the second piece at a non-flowpath location.

In another embodiment according to any of the previous embodiments, the first piece comprises a base portion that rests against the outer surface of the inner structure, a curved scoop body extending outwardly of the base portion to define an inlet to a scoop flow path, and a tubular portion that extends inwardly of the base portion for attachment to the second piece.

In another embodiment according to any of the previous embodiments, the curved scoop body comprises an outer C-shaped curved surface that tapers inwardly along a longitudinal direction from a radially outermost first end to a radially innermost second end.

In another embodiment according to any of the previous embodiments, the second piece comprises a tubular body having a first end that abuts against the tubular portion of the first piece and a second end that defines the air outlet.

In another embodiment according to any of the previous embodiments, at least one portion extends outwardly from the tubular body. The portion includes an attachment interface to secure the second piece to an inner structure.

In another embodiment according to any of the previous embodiments, the first end of the tubular body is positioned in an overlapping relationship with the tubular portion of the first piece to define an attachment interface between the first and second pieces.

In another embodiment according to any of the previous embodiments, the tubular portion of the first piece includes at least one stop that abuts against the first end of the second piece to define an insertion limit.

In another embodiment according to any of the previous embodiments, the assembly includes at least one attachment feature at the attachment interface to secure the first and second pieces together.

In another embodiment according to any of the previous embodiments, a carrier flange extends outwardly from the tubular body adjacent the second end. The carrier flange is configured to support a gasket.

In another featured embodiment, a gas turbine engine has a fan nacelle, and an engine core spaced radially inwardly of the fan nacelle. The engine core has a core nacelle spaced radially inwardly of the fan nacelle to define a bypass flowpath. An inner case is positioned radially inwardly of the core nacelle to define a core flowpath. A scoop directs air from the bypass flowpath into the core flowpath. The scoop has a first piece extending outwardly of an outer surface of the core nacelle to define an air inlet and a second piece extending inwardly relative to the core nacelle to define an air outlet.

In another embodiment according to the previous embodiment, the engine core has a compressor section, a combustor section downstream of the compressor section, and a turbine section downstream of the combustor section. The air outlet is configured to direct air toward the turbine section.

In another embodiment according to any of the previous embodiments, the core nacelle includes an inner structure. The second piece is fixed to the inner structure with at least one first attachment feature. The first piece is fixed to the second piece with at least one second attachment feature.

In another embodiment according to any of the previous embodiments, the first piece has a base portion that rests against the outer surface of the core nacelle. A curved scoop body extends outwardly of the base portion to define a scoop flow path. A tubular portion extends inwardly of the base portion for attachment to the second piece.

In another embodiment according to any of the previous embodiments, the second piece comprises a tubular body having a first end that abuts against the tubular portion of the first piece. A second end defines the air outlet.

In another featured embodiment, a method of assembling a scoop to a nacelle structure includes the steps of: attaching an inner scoop piece to an inner structure of a core nacelle; inserting an outer scoop piece from a location outward of the core nacelle through a hole formed in an outer surface of the core nacelle; and attaching the inner and outer scoop pieces together.

In another embodiment according to the previous embodiment, the step of attaching the inner scoop piece to the inner structure of the core nacelle further includes securing the inner scoop piece to the inner structure with a first attachment feature, and the inserting step further includes securing the inner and outer scoop pieces together with a second attachment feature.

BRIEF DESCRIPTION OF THE DRAWINGS

The disclosure can be further understood by reference to the following detailed description when considered in connection with the accompanying drawings wherein.

DETAILED DESCRIPTION

Figure 1:
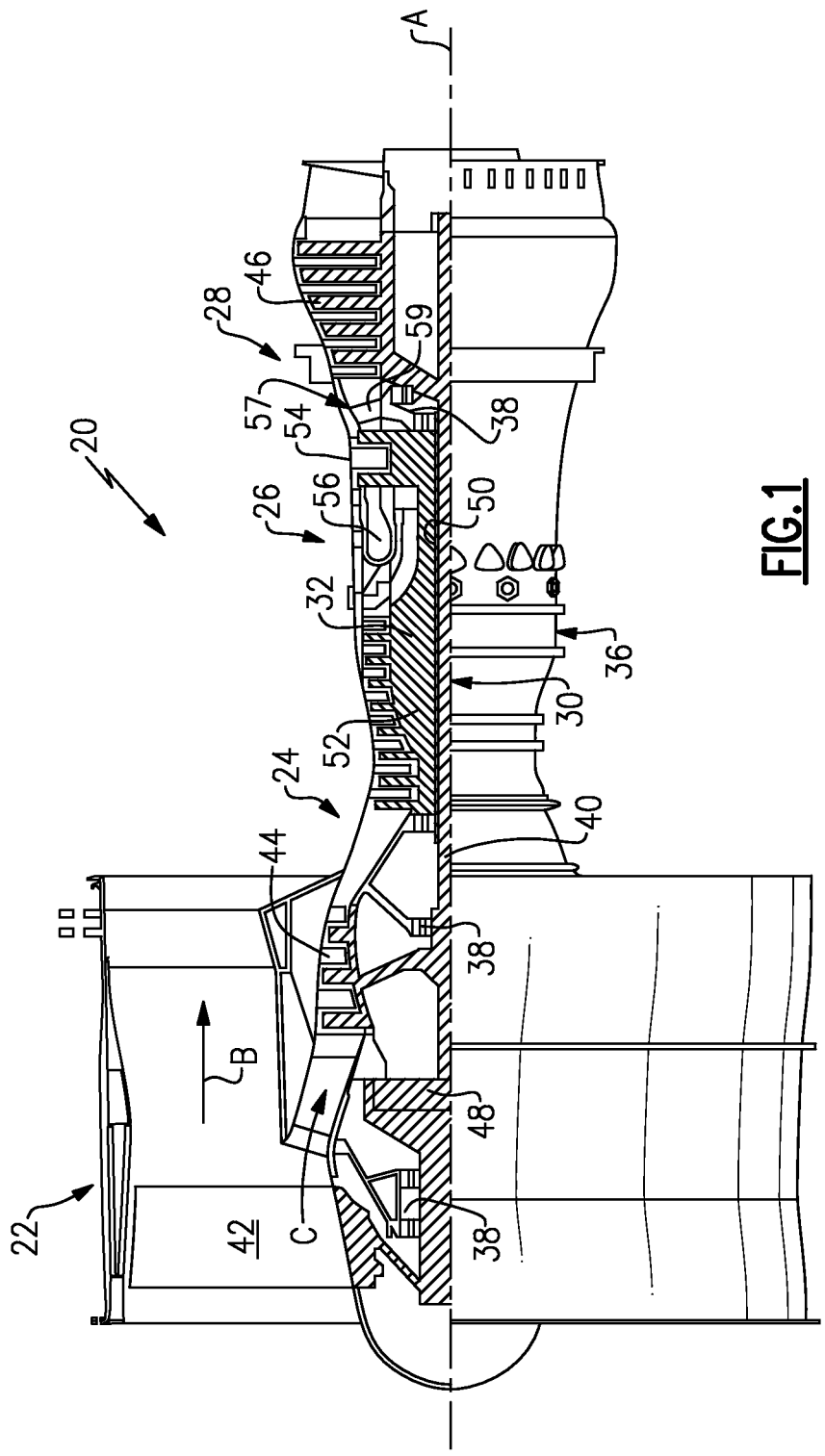
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
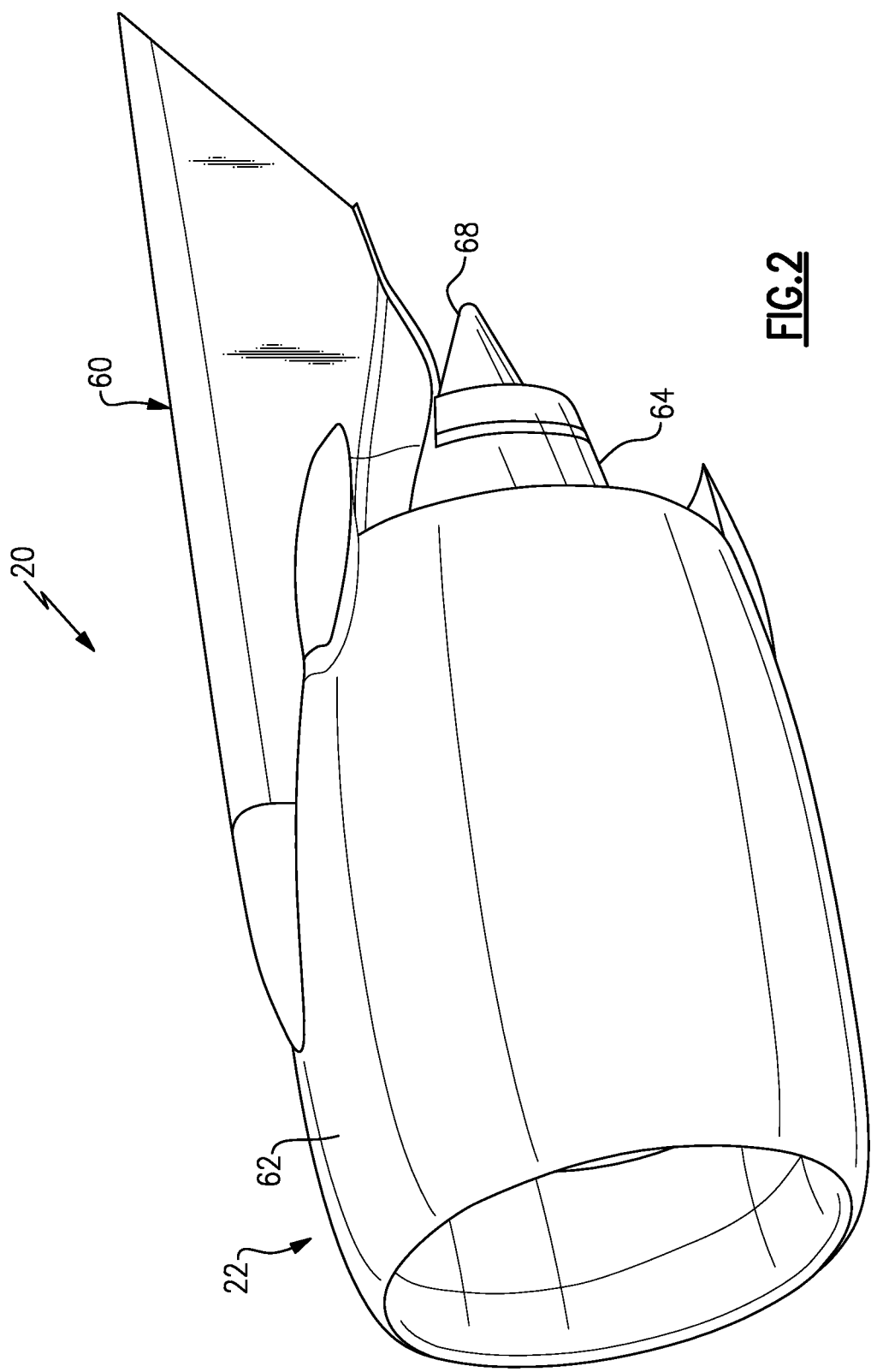
FIG. 2 is a perspective view of a nacelle assembly.
Figure 3:
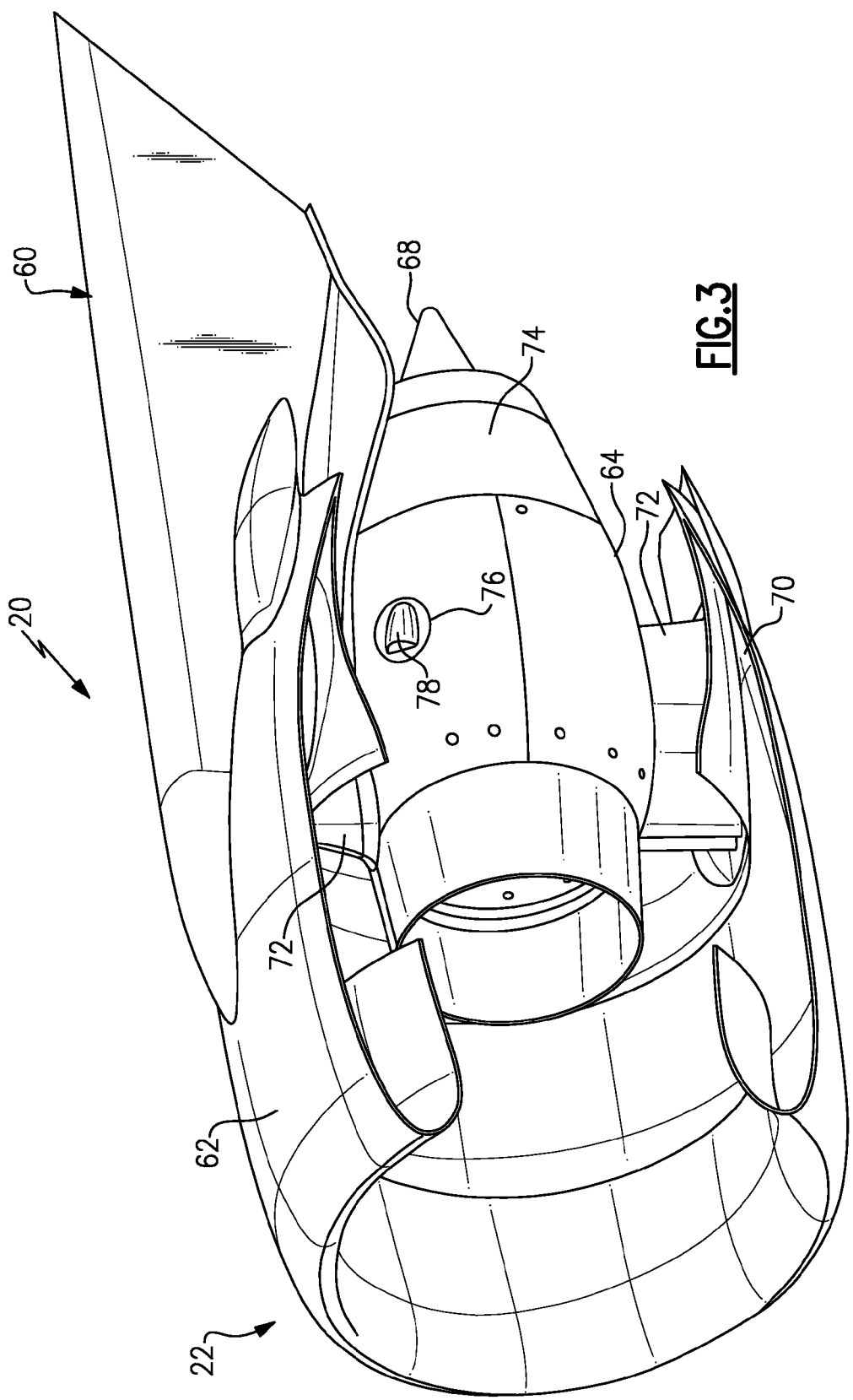
FIG. 3 is cut-away view of FIG. 2 showing an engine core and scoop assembly.
Figure 4:
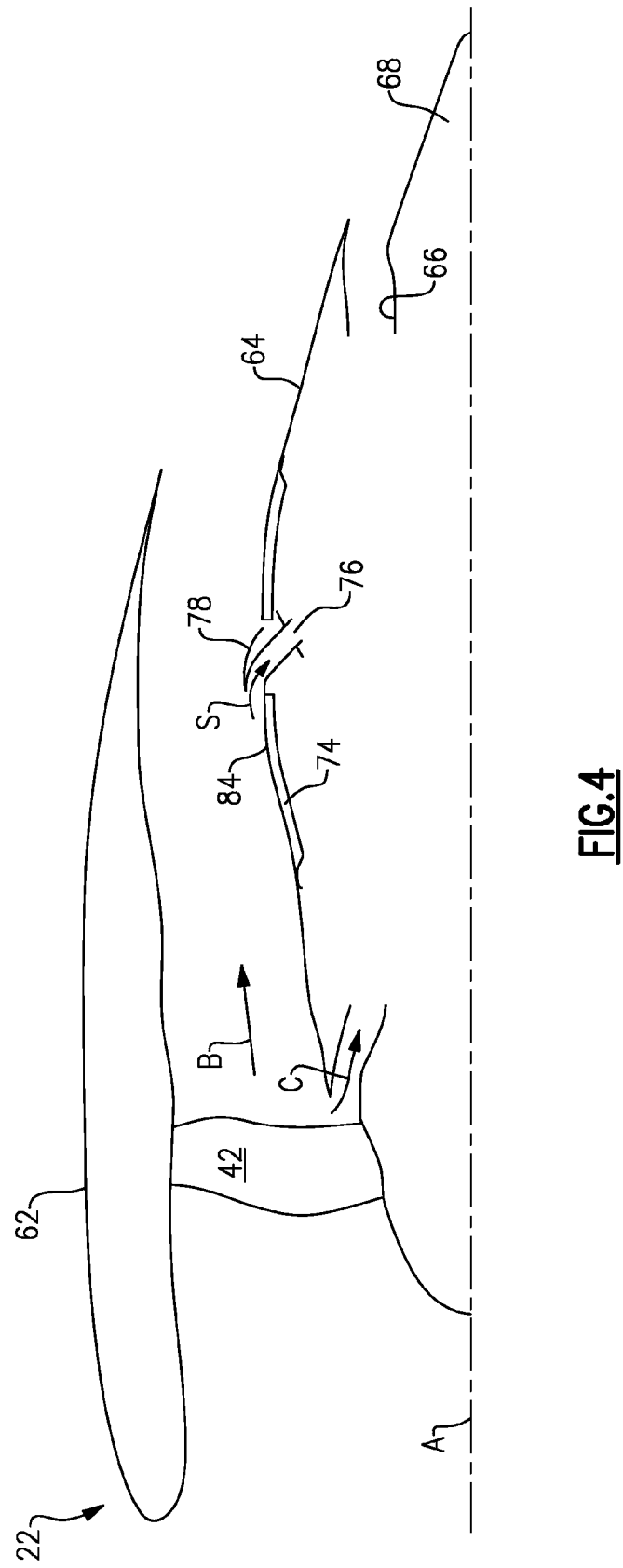
FIG. 4 is a schematic section view of the nacelle assembly of FIG. 3.
Figure 5:
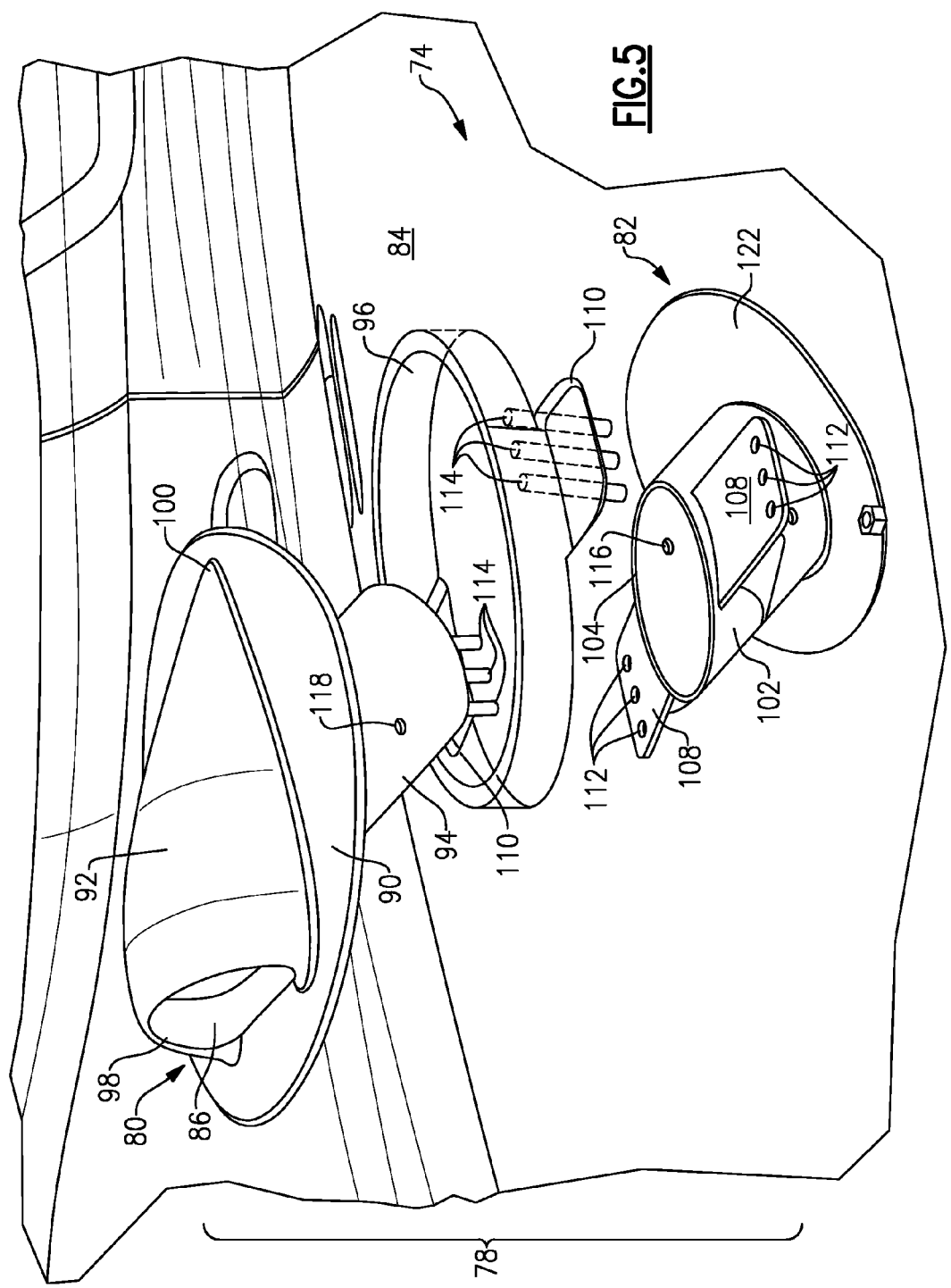
FIG. 5 is an exploded view of a scoop assembly comprised of inner and outer scoop pieces.
Figure 6:
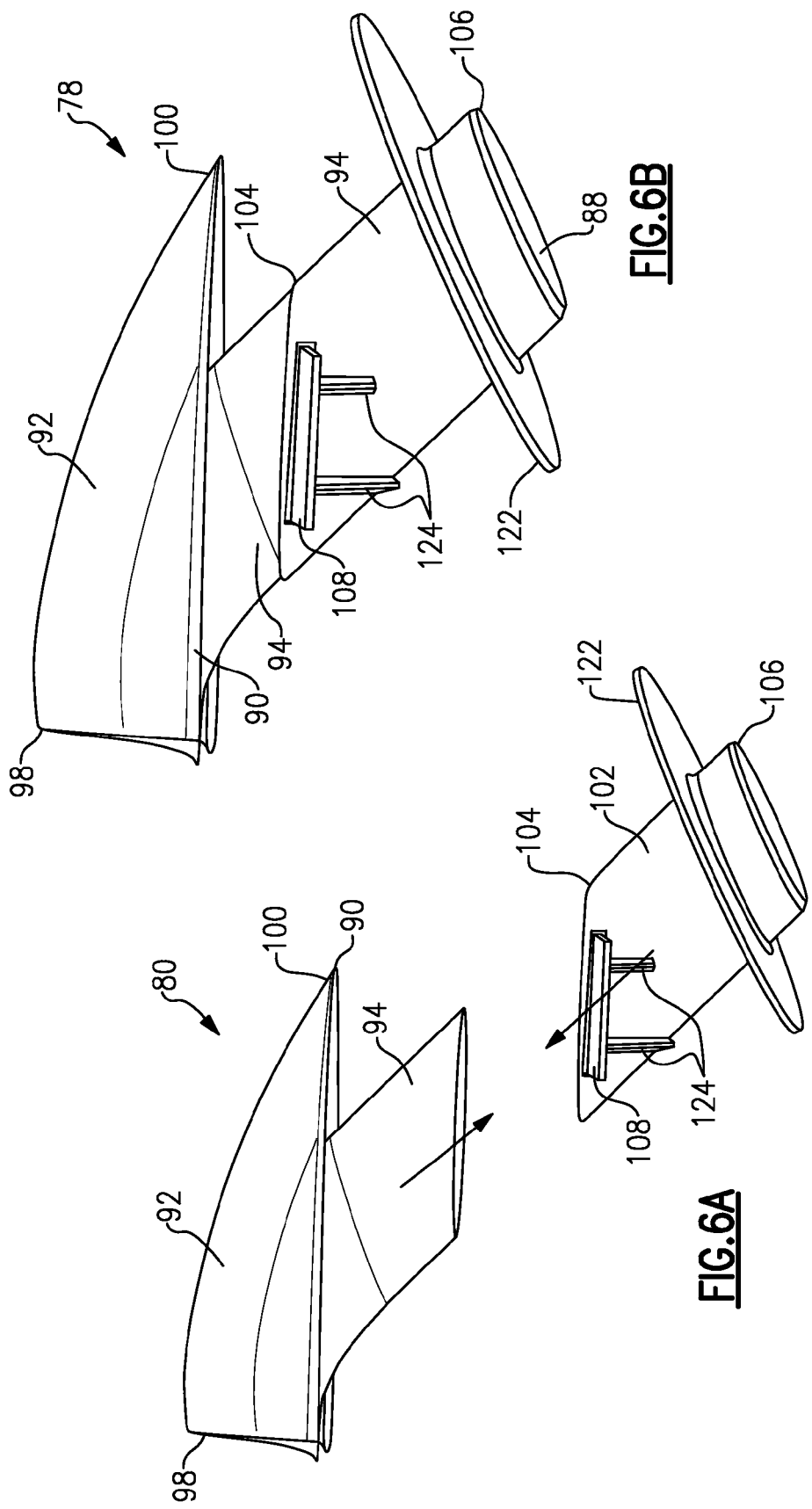
FIG. 6A is a side view of the inner and outer scoop pieces dis-assembled from each other.
FIG. 6B is a side view of the inner and outer scoop pieces assembled together.

FIGS. 2-4 show a nacelle assembly that is configured for attached to a pylon structure 60. The nacelle assembly includes a fan nacelle 62 and a core nacelle 64 that is spaced radially inwardly of the fan nacelle 62 to define the bypass flowpath B. An inner case structure 66 is spaced radially inwardly relative to the core nacelle 64 to define the core flowpath C. Attached to an aft end of the inner case structure 66 is a tailcone 68. The fan nacelle 62 defines an outer fan duct 70 and bifurcations 72 extend from the core nacelle 64 to the outer fan duct 70 to provide support for the engine core.

As shown in FIGS. 3-4, the core nacelle 64 includes an inner structure 74 that has an active case cooling inlet 76. In one example, the inner structure 74 comprises a fixed or stationary inner structure. A scoop 78 is located at this inlet 76 to facilitate directing air from the fan stream, i.e. the bypass flowpath, into the engine core for cooling purposes. In one example, the active case cooling inlet 76 is configured to direct cooling air toward the turbine section 28 (FIG. 1).

The scoop 78 is shown in greater detail in FIGS. 5-9. The scoop 78 comprises a two-piece assembly that includes a first (outer) scoop piece 80 and a second (inner) scoop piece 82 that are attached to each other to form the scoop 78. The outer scoop piece 80 is positioned substantially within the bypass flowpath B and extends outwardly of an outer surface 84 of the core nacelle 64 at the inner structure 74 to define a scoop air inlet 86. The inner scoop piece 82 is positioned internally of the core nacelle 64 and extends inwardly to define a scoop air outlet 88.

The outer scoop piece 80 includes a base portion 90 that rests against the outer surface 84 of the core nacelle 64, a curved scoop body 92 extending outwardly of the base portion 90 to define an initial portion of a scoop flow path S (FIG.

4), and a tubular portion 94 that further defines the scoop flowpath S. The tubular portion 94 extends inwardly of the base portion 90 for attachment to the inner scoop piece 82. The tubular portion 94 is inserted through a hole 96 that is formed within the outer surface 84 of the inner structure 74.

The curved scoop body 92 extends in an axial direction, i.e. longitudinal direction from a first (upstream) end 98 defining the air inlet 86 to a second (downstream) end 100. The longitudinal direction corresponds to a direction defined by the engine longitudinal axis A. In the example shown, the first end 98 is spaced radially outwardly from the base portion 90 by a greater distance than the second end 100. The curved scoop body 92 comprises an outer C-shaped curved surface that tapers radially inwardly along the longitudinal direction from the radially outermost first end 98 to the radially innermost second end 100. In one example, the second end 100 is substantially flush with the base portion 90.

The curved scoop body 92 is also wider at the first end 98 than at the second end 100. The C-shaped curved surface tapers axially inwardly toward a center of the scoop body 92 in the longitudinal direction to form one half of a generally conical shape with the second end 100 forming the tip of the cone.

The inner scoop piece 82 comprises a tubular body 102 having a first end 104 that engages or abuts against the tubular portion 94 of the outer scoop piece 80 and a second end 106 that defines the scoop air outlet 88. One or more wings 108 extend outwardly from the tubular body 102 adjacent the first end 104. The wings 108 are just one example of an attachment configuration, and it should be understood that other configurations such as a flange or using an adhesive, for example, could also be used to secure these components together. In the example shown, the wings 108 comprise an attachment interface to secure the inner scoop piece 82 to a corresponding attachment structure 110 of the inner structure 74. Any type of attachment feature at the attachment interface can be used to attach the inner scoop piece 82 to the inner structure 74. In one example, the wings 108 include one or more holes 112 to receive fasteners 114 to secure the inner scoop piece 82 to the inner structure 74.

The first end 104 of the tubular body 102 is positioned in an overlapping relationship with the tubular portion 94 of the outer piece 80 to define an attachment interface between the outer 80 and inner 82 scoop pieces. Any type of attachment feature at this attachment interface can be used to secure the outer 80 and inner 82 scoop pieces together. In one example, the tubular body 102 includes one or more holes 116 that are aligned with corresponding holes 118 in the tubular portion 94. A second set of fasteners 120 are then inserted through the aligned holes 116, 118 to secure the inner 82 and outer 80 scoop pieces to each other independently of the first set of fasteners 114. Thus, all of the attachment interfaces for securing the scoop pieces 80, 82 to each other and for securing the scoop 78 to the inner structure 74 are located internally of an outer surface of the core nacelle 64, i.e. are located within the non-flowpath side, which eliminates any potential steps or gaps at the outer flow surface.

In one example, a carrier flange 122 extends outwardly from the tubular body 102 adjacent the second end 100. The carrier flange 122 is configured to support a gasket that seals against a core structure (not shown). Additionally, gussets 124 extend from a lower surface of the wings 108 to the tubular body 102 to provide additional support at the attachment interface to the inner structure 74.

Figure 7:
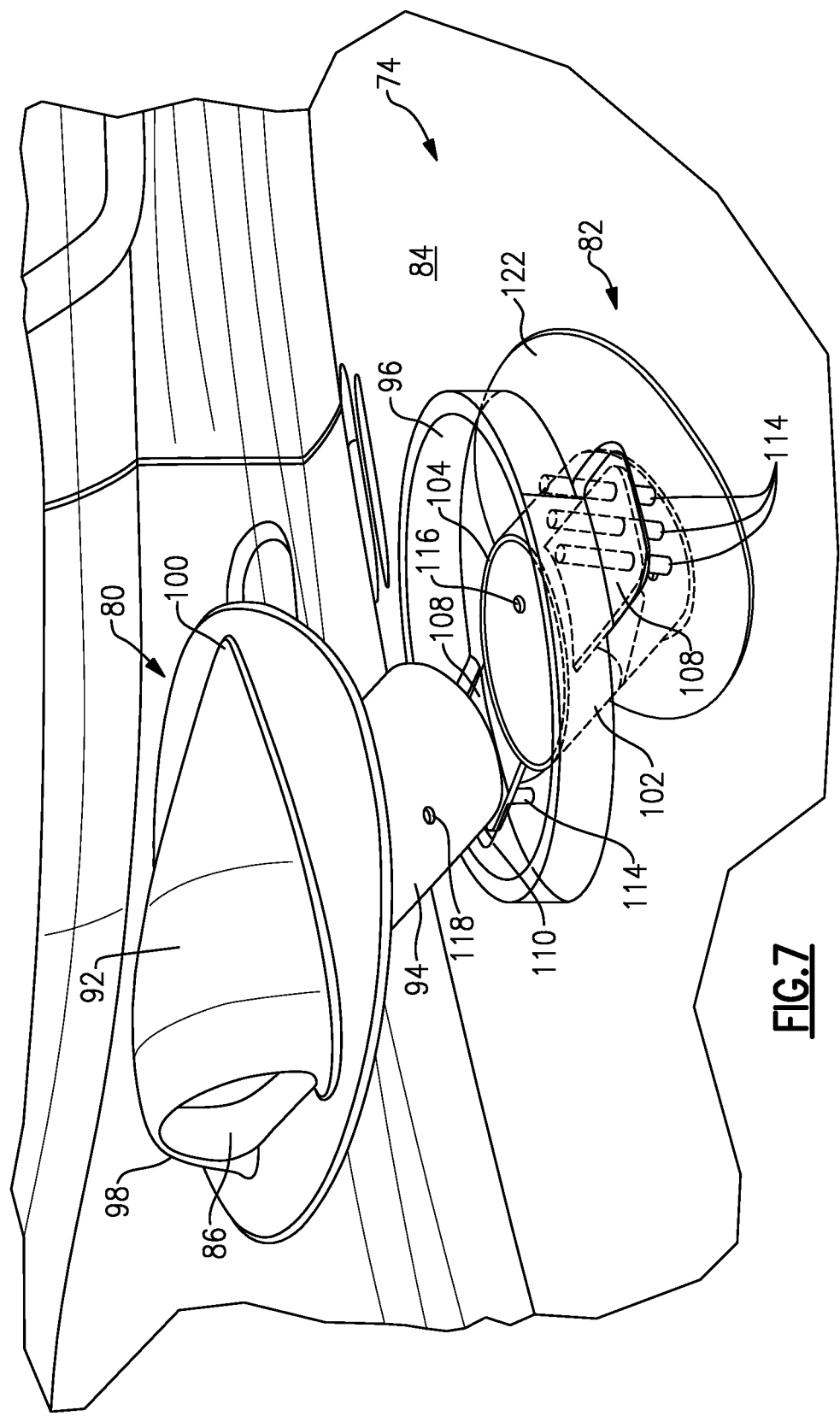
FIG. 7 shows a first assembly step of the scoop assembly where the inner scoop piece is attached to an inner structure.
Figure 8:
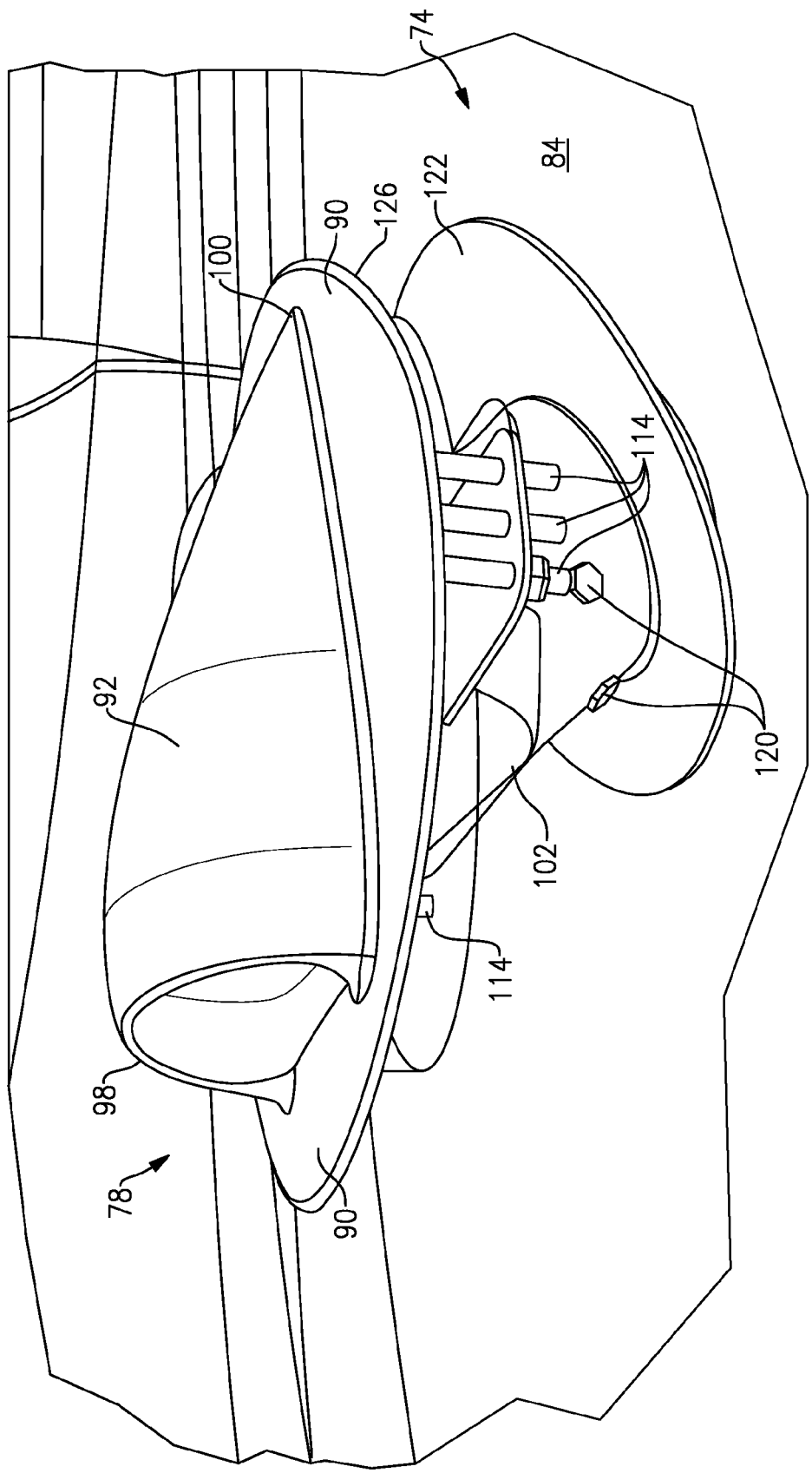
FIG. 8 shows a second assembly step of the scoop assembly where the outer scoop piece is attached to the inner scoop piece.
Figure 9:
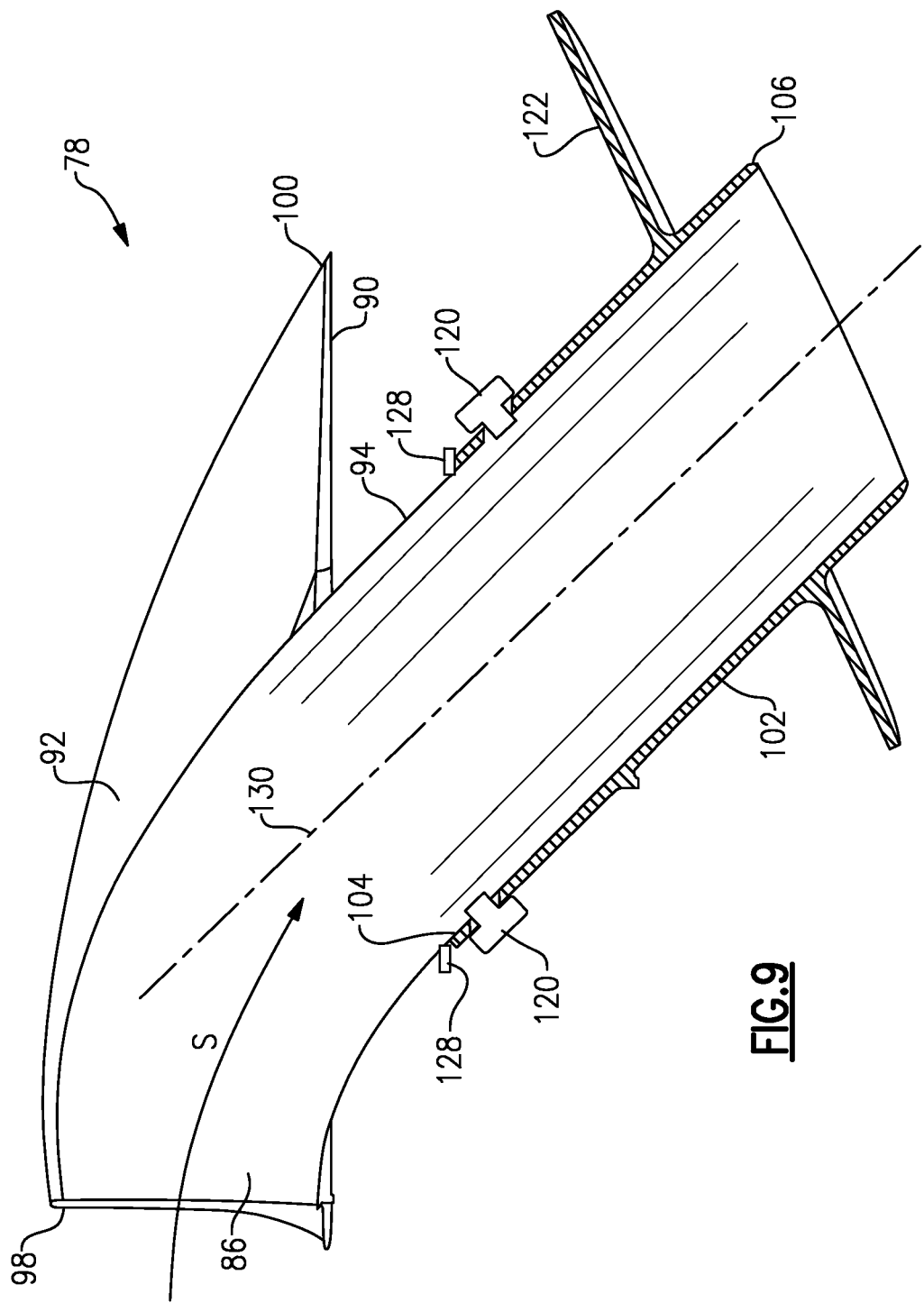
FIG. 9 shows a scoop section view when the first and second scoop pieces are assembled together.

The method of assembling the scoop 78 is shown in FIGS. 7-9. First, as shown in FIG. 7, the first end 104 of the inner scoop piece 82 is aligned with the hole 96 at an internal core location, i.e. at a location from within the core nacelle 64. The inner scoop piece 82 is then fixed in place by fastening the wings 108 to the inner fixed structure 78. Second, as shown in FIG. 8, the tubular portion 94 of the outer piece 80 is inserted through the hole 96 from an external core location, i.e. from a location that is external to the core nacelle 64. The tubular portion 94 is received within the first end 104 of the tubular body 102 to align the holes 116, 118. Then, the fasteners 120 are inserted through the holes 116, 118 to secure the inner 82 and outer 80 pieces together. Sealing material is then used to seal edges 126 of the base portion 90 against the outer flows surface of the inner structure 74. In one example, RTV silicone is used to provide a complete seal between the outer scoop piece 80 and the outer flow surface of the inner structure 74.

In one example, shown in FIG. 9, the tubular portion 94 of the outer scoop piece 80 includes one or more stops 128 that abut against the first end 104 of the inner scoop piece 82 to define an insertion limit for the outer scoop piece 80. The inner 82 and outer 80 scoop pieces are secured together as shown in FIG. 9, to define the scoop flowpath S which extends from the scoop air inlet 86 to the scoop air outlet 88.

In one example, the inlet 86 has an opening relative to the base portion 90 that is defined by a center axis that is generally parallel with the engine longitudinal axis A. The tubular portion 94 extends downwardly from the base portion 90 at an obtuse angle relative to the engine longitudinal axis A. The tubular body portion 102 is axially aligned with the tubular portion 94 to form the remaining portion of the flowpath S. Thus, the majority of the flowpath S is defined by an axis 130 that is traverse to the engine longitudinal axis A.

Using a scoop 78 comprised of two separate pieces that are assembled together from two different directions allows for a larger flow path piece, i.e. outer scoop piece 80, to be inserted from the flowpath side, with the mechanical connection to the inner scoop piece 82 being advantageously located on the non-flowpath side. Further, the non-flowpath side also provides the attachment to the overall structure. Additionally, the two-piece design allows for alternate inlets to be configured with varying dimensions to provide tailored cooling for different applications without having to increase the hole size through the inner structure.

Although an example embodiment has been disclosed, a worker of ordinary skill in this art would recognize that certain modifications would come within the scope of the claims. For that reason, the following claims should be studied to determine their true scope and content.

What is claimed is:

1. A nacelle assembly comprising:
a fan nacelle;
a core nacelle spaced radially inwardly of the fan nacelle to define a bypass flowpath; and
a scoop to direct air from the bypass flowpath into an engine core, wherein the scoop is comprised of a first piece extending outwardly of an outer surface of the core nacelle to define an air inlet and a second piece extending inwardly relative to the core nacelle to define an air outlet, and wherein the scoop is attached to an inner structure of the core nacelle at a first attachment interface and the first and second pieces are attached to each other via a second attachment interface, and wherein the first and second attachment interfaces are located internally of the core nacelle.

2. The nacelle assembly according to claim 1 wherein the first and second pieces are positioned in an overlapping relationship and are attached to each other via the second attachment interface.

3. The nacelle assembly according to claim 1 wherein the second piece is fixed to the inner structure via the first attachment interface.

4. The nacelle assembly according to claim 1 wherein the core nacelle includes a hole formed in an outer surface of the inner structure and wherein the first piece includes a tubular portion to be inserted through the hole in a direction from outside the core nacelle, the first piece being attached to the second piece at a non-flowpath location internally within the core nacelle.

5. A nacelle assembly comprising:
a fan nacelle;
a core nacelle spaced radially inwardly of the fan nacelle to define a bypass flowpath, and wherein the core nacelle includes a hole formed in an outer surface of an inner structure; and
a scoop to direct air from the bypass flowpath into an engine core, wherein the scoop is comprised of a first piece extending outwardly of an outer surface of the core nacelle to define an air inlet and a second piece extending inwardly relative to the core nacelle to define an air outlet, and wherein the first piece includes a tubular portion to be inserted through the hole in a direction from outside the core nacelle, the first piece being attached to the second piece at a non-flowpath location, and wherein the first piece comprises a base portion that rests against the outer surface of the inner structure, a curved scoop body extending outwardly of the base portion to define an inlet to a scoop flow path, and a tubular portion that extends inwardly of the base portion for attachment to the second piece.

6. The nacelle assembly according to claim 5 wherein the curved scoop body comprises an outer C-shaped curved surface that tapers inwardly along a longitudinal direction from a radially outermost first end to a radially innermost second end.

7. The nacelle assembly according to claim 5 wherein the second piece comprises a tubular body having a first end that abuts against the tubular portion of the first piece and a second end that defines the air outlet.

8. The nacelle assembly according to claim 7 including at least one portion extending outwardly from the tubular body, the portion including an attachment interface to secure the second piece to an inner structure.

9. The nacelle assembly according to claim 7 wherein the first end of the tubular body is positioned in an overlapping relationship with the tubular portion of the first piece to define an attachment interface between the first and second pieces.

10. The nacelle assembly according to claim 9 wherein the tubular portion of the first piece includes at least one stop that abuts against the first end of the second piece to define an insertion limit.

11. The nacelle assembly according to claim 9 including at least one attachment feature at the attachment interface to secure the first and second pieces together.

12. The nacelle assembly according to claim 7 including a carrier flange extending outwardly from the tubular body adjacent the second end, the carrier flange configured to support a gasket.

13. A gas turbine engine comprising:
a fan nacelle;
an engine core spaced radially inwardly of the fan nacelle, the engine core comprising a core nacelle spaced radially inwardly of the fan nacelle to define a bypass flowpath and an inner case positioned radially inwardly of the core nacelle to define a core flowpath; and
a scoop to direct air from the bypass flowpath into the core flowpath, wherein the scoop is comprised of a first piece extending outwardly of an outer surface the core nacelle to define an air inlet and a second piece extending inwardly relative to the core nacelle to define an air outlet, wherein the scoop is attached to an inner structure of the core nacelle at a first attachment interface and the first and second pieces are attached to each other via a second attachment interface, and wherein the first and second attachment interfaces are located internally of the core nacelle.

14. The gas turbine engine according to claim 13 wherein the engine core comprises a compressor section, a combustor section downstream of the compressor section, and a turbine section downstream of the combustor section, and wherein the air outlet is configured to direct air toward the turbine section.

15. The gas turbine engine according to claim 13 wherein the second piece is fixed to the inner structure via the first attachment interface, and wherein the first piece is positioned in an overlapping relationship with the second piece to be secured together via the second attachment interface.

16. A gas turbine engine comprising:
a fan nacelle;
an engine core spaced radially inwardly of the fan nacelle, the engine core comprising a core nacelle spaced radially inwardly of the fan nacelle to define a bypass flowpath and an inner case positioned radially inwardly of the core nacelle to define a core flowpath, wherein the core nacelle includes an inner structure; and
a scoop to direct air from the bypass flowpath into the core flowpath, wherein the scoop is comprised of a first piece extending outwardly of an outer surface the core nacelle to define an air inlet and a second piece extending inwardly relative to the core nacelle to define an air outlet, and wherein the second piece is fixed to the inner structure with at least one first attachment feature, and wherein the first piece is fixed to the second piece with at least one second attachment feature, and wherein the first piece comprises a base portion that rests against the outer surface of the core nacelle, a curved scoop body extending outwardly of the base portion to define a scoop flow path, and a tubular portion that extends inwardly of the base portion for attachment to the second piece.

17. The gas turbine engine according to claim 16 wherein the second piece comprises a tubular body having a first end that abuts against the tubular portion of the first piece and a second end that defines the air outlet.

18. A method of assembling a scoop to a nacelle structure comprising the steps of:
(a) attaching an inner scoop piece to an inner structure of a core nacelle via a first attachment interface;
(b) inserting an outer scoop piece from a location outward of the core nacelle through a hole formed in an outer surface of the core nacelle; and
(c) attaching the inner and outer scoop pieces together via a second attachment interface, wherein the first and second attachment interfaces are located internally of the core nacelle.

19. The method according to claim 18 wherein step (a) includes securing the inner scoop piece to the inner structure with at least one first fastener and step (b) includes securing the inner and outer scoop pieces together with at least one second fastener independent of the first fastener.

20. The method according to claim 18 including providing the first piece with a first tubular portion and the second piece with a second tubular portion, and wherein step (c) includes overlapping the first and second tubular portions in a telescoping relationship and fastening the first and second tubular portions together with the at least one second fastener.

21. The method according to claim 18 including providing with the first piece with a base portion that rests against an outer surface of the inner structure, a curved scoop body that extends outwardly of the base portion to define an inlet to a scoop flow path, and a tubular portion that extends inwardly of the base portion for attachment to the second piece via the second attachment interface.

22. The nacelle assembly according to claim 1 wherein the first piece has a scoop body having a first end and a second end, and with the scoop body tapering to decrease in size from the first end to the second end.

23. The gas turbine engine according to claim 13 wherein the first piece has a scoop body having a first end and a second end, and with the scoop body tapering to decrease in size from the first end to the second end.

24. The gas turbine engine according to claim 13 wherein the first attachment interface comprises a first set of fasteners and the second attachment interface comprises a second set of fasteners independent of the first set of fasteners.

* * * * *